US012657519B2

(12) United States Patent
Butt et al.

(10) Patent No.: US 12,657,519 B2
(45) Date of Patent: Jun. 16, 2026

(54) HOST ASYNCHRONOUS FEDERATED LEARNING MODEL COLLECTION

(71) Applicant: NOKIA TECHNOLOGIES OY, Espoo (FI)

(72) Inventors: Muhammad Majid Butt, Palaiseau (FR); Stephen Mwanje, Dorfen (DE); István Zsolt Kovács, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 559 days.

(21) Appl. No.: 18/266,038

(22) PCT Filed: Dec. 29, 2021

(86) PCT No.: PCT/EP2021/087772
§ 371 (c)(1),
(2) Date: Jun. 8, 2023

(87) PCT Pub. No.: WO2022/171354
PCT Pub. Date: Aug. 18, 2022

(65) Prior Publication Data
US 2024/0037450 A1 Feb. 1, 2024

Related U.S. Application Data

(60) Provisional application No. 63/148,452, filed on Feb. 11, 2021.

(51) Int. Cl.
*G06N 20/00* (2019.01)
(52) U.S. Cl.
CPC ..................................... *G06N 20/00* (2019.01)
(58) Field of Classification Search
CPC ................................ G06N 20/10; G06N 20/00
(Continued)

(56) References Cited

U.S. PATENT DOCUMENTS

| | | | |
|---|---|---|---|
| 2020/0374711 A1* | 11/2020 | Honkasalo | G06N 3/0442 |
| 2023/0012248 A1* | 1/2023 | Jawwad | H04L 41/0833 |
| 2023/0041074 A1* | 2/2023 | Moradi | G06N 20/00 |

FOREIGN PATENT DOCUMENTS

| | | |
|---|---|---|
| WO | 2022/028663 A1 | 2/2022 |
| WO | 2022/028665 A1 | 2/2022 |

(Continued)

OTHER PUBLICATIONS

Hung T. Nguyen et al., "Fast-Convergent Federated Learning", Jan. 2021, IEEE Journal on Selected Areas in Communications, vol. 39, No. 1.*

(Continued)

*Primary Examiner* — Hung T Vy
(74) *Attorney, Agent, or Firm* — Barta Jones, PLLC

(57) ABSTRACT

Systems, methods, apparatuses, and computer program products for cluster based local ML model training host selection in asynchronous federated learning model collection. A method may include transmitting local model parameters following training of a model of at least one network element to a network node to be used to cluster the at least one network element with one or more other network elements. The method may also include training, by one or more network elements selected from the cluster, an aggregated model using the local model parameters. The method may further include transmitting, by the one or more network elements selected from the cluster, updated local model parameters of the at least one network element as a result of the training to the network node.

20 Claims, 9 Drawing Sheets

(58) Field of Classification Search
USPC .......................................................... 706/12
See application file for complete search history.

(56) References Cited

FOREIGN PATENT DOCUMENTS

| | | |
|---|---|---|
| WO | 2022/089751 A1 | 5/2022 |
| WO | 2022/171536 A1 | 8/2022 |

OTHER PUBLICATIONS

Office action received for corresponding European Patent Application No. 21847516.8, dated Aug. 6, 2025, 7 pages.
Office action received for corresponding European Patent Application No. 21847516.8, dated Jun. 26, 2024, 8 pages.
International Search Report and Written Opinion dated Apr. 12, 2022 corresponding to International Patent Application No. PCT/EP2021/087772.
Hung T. Nguyen et al., "Fast-Convergent Federated Learning," IEEE Journal on Selected Areas in Communications, vol. 39, No. 1, Nov. 9, 2020, pp. 201-218, XP011826394.
3GPP TR 22.874 V0.1.0 (Sep. 2020), Technical Report, 3rd Generation Partnership Project; Technical Specification Group Services and System Aspects; Study on traffic characteristics and performance requirements for AI/ML model transfer in 5GS (Release 18), Sep. 2020.
Mingzhe Chen et al., "Convergence Time Optimization for Federated Learning over Wireless Networks," arXiv:2001.07845v2, Mar. 26, 2021.
3GPP TR 23.700-91 V17.0.0 (Dec. 2020), 3rd Generation Partnership Project; Technical Specification Group Services and System Aspects; Study on enablers for network automation for the 5G System (5GS); Phase 2 (Release 17), Dec. 2020.
H. H. Yang, Z. Liu, T. Q. S. Quek and H. V. Poor, "Scheduling Policies for Federated Learning in Wireless Networks," in IEEE Transactions on Communications, vol. 68, No. 1, pp. 317-333, Jan. 2020.

* cited by examiner time (t)

500 — In synchronous mode, MTH receives model parameters from the DTHs

505 — Evaluate parameters to form clusters

510 — Inform ML model scheduler about clusters

515 — Delay

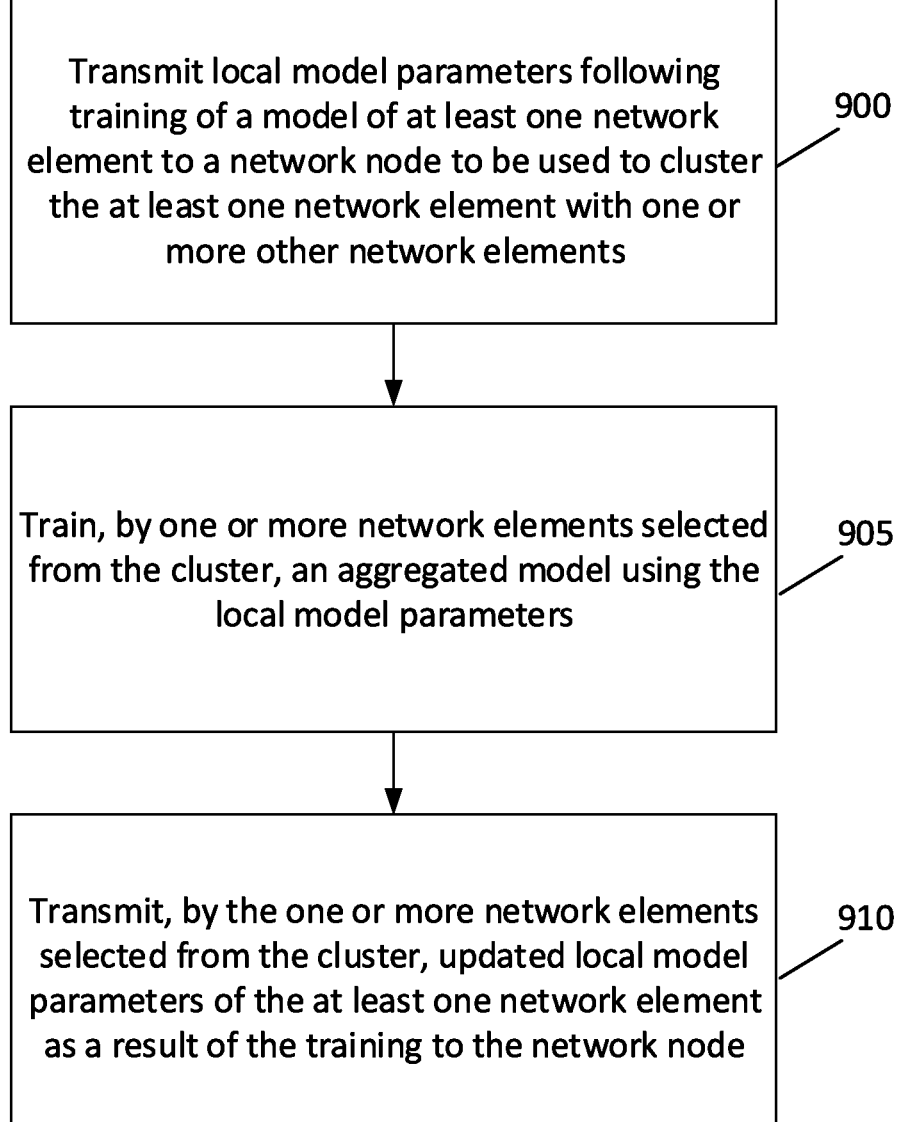

Transmit local model parameters following training of a model of at least one network element to a network node to be used to cluster the at least one network element with one or more other network elements    900

Train, by one or more network elements selected from the cluster, an aggregated model using the local model parameters    905

Transmit, by the one or more network elements selected from the cluster, updated local model parameters of the at least one network element as a result of the training to the network node    910

FIG. 9

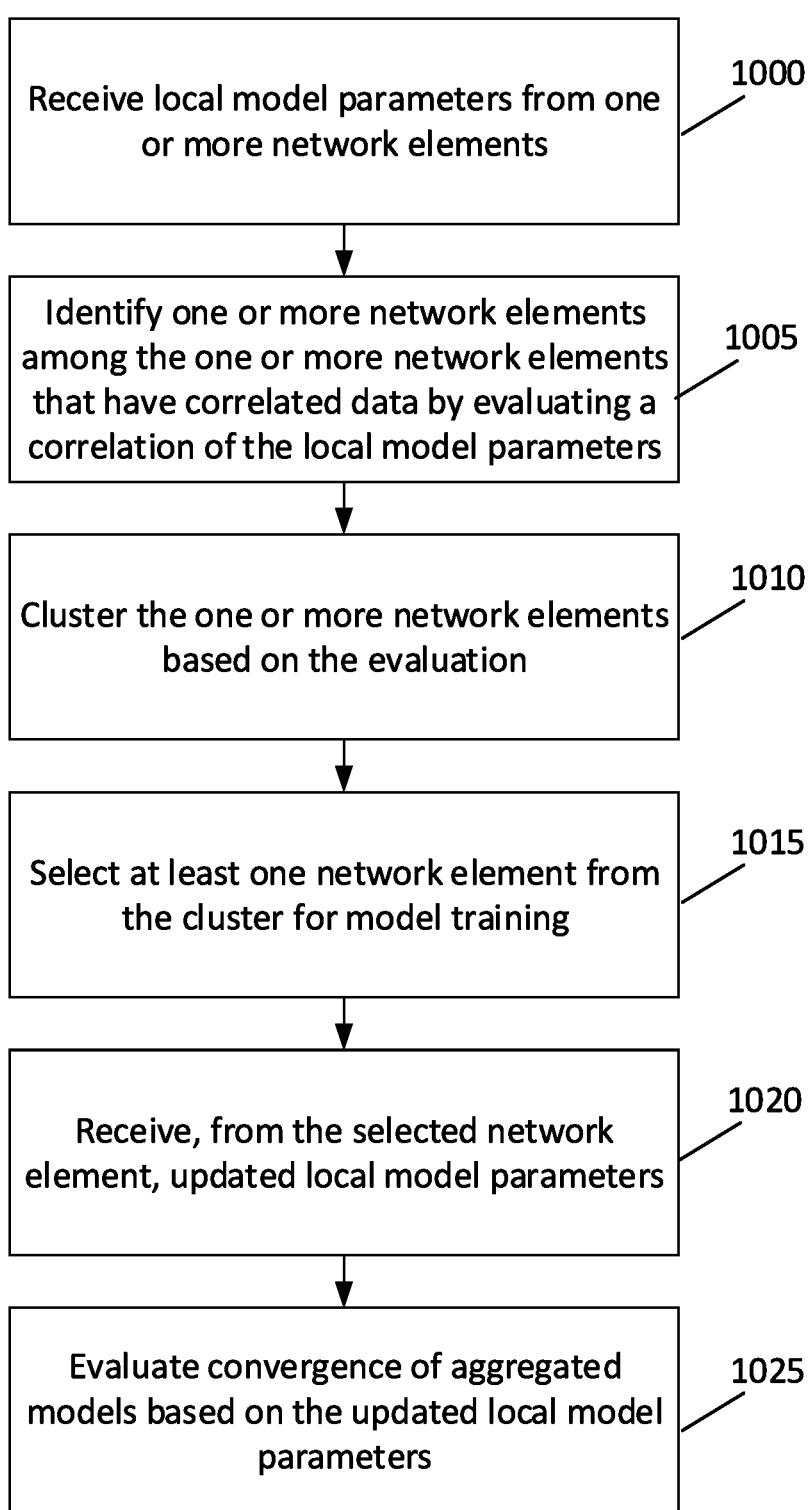

Receive local model parameters from one or more network elements — 1000

Identify one or more network elements among the one or more network elements that have correlated data by evaluating a correlation of the local model parameters — 1005

Cluster the one or more network elements based on the evaluation — 1010

Select at least one network element from the cluster for model training — 1015

Receive, from the selected network element, updated local model parameters — 1020

Evaluate convergence of aggregated models based on the updated local model parameters — 1025

FIG. 10

HOST ASYNCHRONOUS FEDERATED LEARNING MODEL COLLECTION

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for cluster based training host selection in asynchronous federated learning model collection.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G is mostly built on a new radio (NR), but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR radio and named NG-eNB when built on E-UTRAN radio.

SUMMARY

Some example embodiments are directed to a method. The method may include transmitting local model parameters following training of a model of at least one network element to a network node to be used to cluster the at least one network element with one or more other network elements. The method may also include training, by one or more network elements selected from the cluster, an aggregated model using the local model parameters. The method may further include transmitting, by the one or more network elements selected from the cluster, updated local model parameters of the at least one network element as a result of the training to the network node.

Other example embodiments are directed to an apparatus that may include at least one processor and at least one memory including computer program code. The at least one memory and the computer program code are configured, with the at least one processor to cause the apparatus at least to transmit local model parameters following training of a model of at least one network element to a network node to be used to cluster the at least one network element with one or more other network element. The apparatus may also be caused to train, by one or more network elements selected from the cluster, an aggregated model using the local model parameters. The apparatus may further be caused to transmit, by the one or more network elements selected from the cluster, updated local model parameters of the at least one network element as a result of the training to the network node.

Other example embodiments are directed to an apparatus. The apparatus may include means for transmitting local model parameters following training of a model of at least one network element to a network node to be used to cluster the at least one network element with one or more other network elements. The apparatus may also include means for training, by one or more network elements selected from the cluster, an aggregated model using the local model parameters. The apparatus may further include means for transmitting, by the one or more network elements selected from the cluster, updated local model parameters of the at least one network element as a result of the training to the network node.

In accordance with other example embodiments, a non-transitory computer readable medium may be encoded with instructions that may, when executed in hardware, perform a method. The method may include transmitting local model parameters following training of a model of at least one network element to a network node to be used to cluster the at least one network element with one or more other network elements. The method may also include training, by one or more network elements selected from the cluster, an aggregated model using the local model parameters. The method may further include transmitting, by the one or more network elements selected from the cluster, updated local model parameters of the at least one network element as a result of the training to the network node.

Other example embodiments may be directed to a computer program product that performs a method. The method may include transmitting local model parameters following training of a model of at least one network element to a network node to be used to cluster the at least one network element with one or more other network elements. The method may also include training, by one or more network elements selected from the cluster, an aggregated model using the local model parameters. The method may further include transmitting, by the one or more network elements selected from the cluster, updated local model parameters of the at least one network element as a result of the training to the network node.

Other example embodiments may be directed to an apparatus that may include circuitry configured to transmit local model parameters following training of a model of at least one network element to a network node to be used to cluster the at least one network element with one or more other network element. The apparatus may also include circuitry configured to train, by one or more network elements selected from the cluster, an aggregated model using the local model parameters. The apparatus may further include circuitry configured to transmit, by the one or more network elements selected from the cluster, updated local model parameters of the at least one network element as a result of the training to the network node.

Certain example embodiments may be directed to a method. The method may include receiving local model parameters from one or more network elements. The method may also include identifying one or more network elements among the one or more network elements that have correlated data by evaluating a correlation of the local model parameters. The method may further include clustering the one or more network elements based on the evaluation. In addition, the method may include selecting at least one network element from the cluster for model training. Further, the method may include receiving, from the selected network element, updated local model parameters. The method may also include evaluating convergence of aggregated models based on the updated local model parameters.

Other example embodiments may be directed to an apparatus. The apparatus may include at least one processor and at least one memory including computer program code. The at least one memory and computer program code may be configured to, with the at least one processor, cause the apparatus at least to receive local model parameters from one or more network elements. The apparatus may also be caused to identify one or more network elements among the one or more network elements that have correlated data by evaluating a correlation of the local model parameters. The apparatus may further be caused to cluster the one or more network elements based on the evaluation. In addition, the apparatus may be caused to select at least one network element from the cluster for model training. Further, the apparatus may be caused to receive, from the selected network element, updated local model parameters. The apparatus may also be caused to evaluate convergence of aggregated models based on the updated local model parameters.

Other example embodiments may be directed to an apparatus. The apparatus may include means for receiving local model parameters from one or more network elements. The apparatus may also include means for identifying one or more network elements among the one or more network elements that have correlated data by evaluating a correlation of the local model parameters. The apparatus may further include means for clustering the one or more network elements based on the evaluation. In addition, the apparatus may include means for selecting at least one network element from the cluster for model training. Further, the apparatus may include means for receiving, from the selected network element, updated local model parameters. The apparatus may also include means for evaluating convergence of aggregated models based on the updated local model parameters.

In accordance with other example embodiments, a non-transitory computer readable medium may be encoded with instructions that may, when executed in hardware, perform a method. The method may include receiving local model parameters from one or more network elements. The method may also include identifying one or more network elements among the one or more network elements that have correlated data by evaluating a correlation of the local model parameters. The method may further include clustering the one or more network elements based on the evaluation. In addition, the method may include selecting at least one network element from the cluster for model training. Further, the method may include receiving, from the selected network element, updated local model parameters. The method may also include evaluating convergence of aggregated models based on the updated local model parameters.

Other example embodiments may be directed to a computer program product that performs a method. The method may include receiving local model parameters from one or more network elements. The method may also include identifying one or more network elements among the one or more network elements that have correlated data by evaluating a correlation of the local model parameters. The method may further include clustering the one or more network elements based on the evaluation. In addition, the method may include selecting at least one network element from the cluster for model training. Further, the method may include receiving, from the selected network element, updated local model parameters. The method may also include evaluating convergence of aggregated models based on the updated local model parameters.

Other example embodiments may be directed to an apparatus that may include circuitry configured to receive local model parameters from one or more network elements. The apparatus may also include circuitry configured to identify one or more network elements among the one or more network elements that have correlated data by evaluating a correlation of the local model parameters. The apparatus may further include circuitry configured to cluster the one or more network elements based on the evaluation. In addition, the apparatus may include circuitry configured to select at least one network element from the cluster for model training. Further, the apparatus may include circuitry configured to receive, from the selected network element, updated local model parameters. The apparatus may also include circuitry configured to evaluate convergence of aggregated models based on the updated local model parameters.

BRIEF DESCRIPTION OF THE DRAWINGS

For proper understanding of example embodiments, reference should be made to the accompanying drawings, wherein:

FIG. 9 illustrates a flow diagram of a method, according to certain example embodiments.

FIG. 10 illustrates a flow diagram of another method, according to certain example embodiments.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for cluster based training host selection in asynchronous federated learning model collection.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

Applications in mobile networks may sometimes require a large amount of data from multiple distributed sources including, for example, user equipment (UEs), to be used to train a single common model. To minimize the data exchange between the distributed units from where the data is generated and the centralized units where the common model is created, the concept of federated learning (FL) may be applied. FL is a form of machine learning (ML) where, instead of model training at a single node, different versions of the model are trained at the different distributed hosts. This differs from distributed ML where a single ML model is trained at distributed nodes to utilize the computational power of different nodes. In other words, FL differs from distributed learning in the sense that each distributed node in a FL scenario has its own local data, which may not come from the same distribution as the data at other nodes. Further, each node may compute parameters for its local ML model, and the central host may not compute a version or part of the model, but instead combines parameters of all the distributed models to generate a main model. This approach may keep the training dataset where it is generated, and perform the model training locally at each individual learner in the federation.

Figure 1:
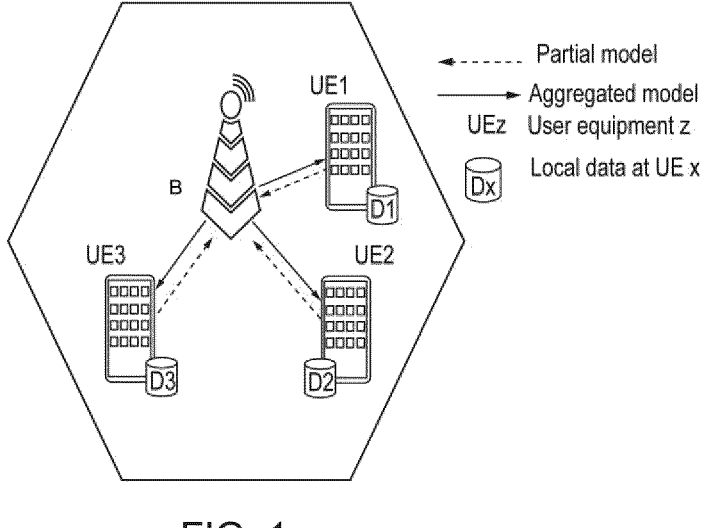
FIG. 1 illustrates an example of a federated learning (FL) concept.

FIG. 1 illustrates an example of a FL learning concept. As illustrated in FIG. 1, in the FL learning concept, UE1, UE2, and UE3, which may also be represented as distributed learning hosts (DTHs), may use their own local data sets to compute localized ML model. This model may be transmitted to a gNB, which may also be represented as a central meta training host (MTH), that aggregates this model and sends it back to the UEs. After training a local ML model, each individual learner (e.g., UE/DTH), may transfer its local model parameters to an aggregating unit (e.g., gNB/MTH). In certain cases, the local model parameters may be transferred instead of raw training datasets. Once received, the MTH may utilize the local model parameters to update a global model which may eventually be fed back to the DTHs for further iterations until a global model converges. As a result, each DTH may benefit from the datasets of the other DTHs through the global model shared by the MTH without explicitly accessing high volume of privacy-sensitive data available at each of the other DTHs.

Figure 2:
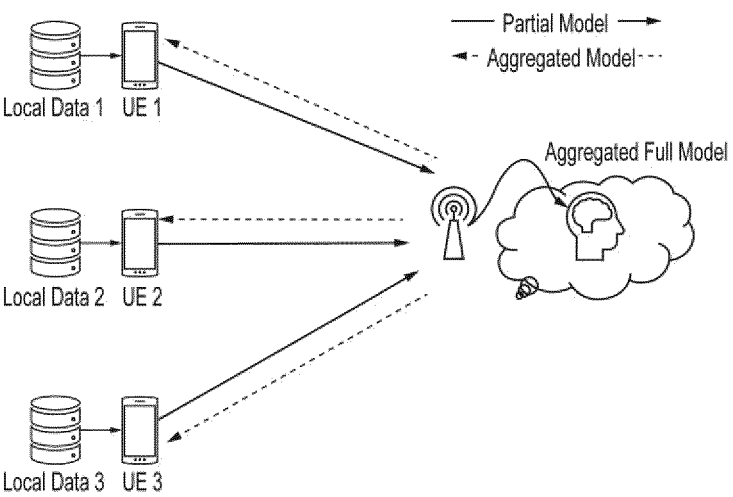
FIG. 2 illustrates example block diagram of a FL model in a wireless network.

FIG. 2 illustrates example block diagram of a FL learning model in a wireless network. As illustrated in FIG. 2, the partial model and aggregated model may both be transmitted on regular communication links in multiple iterations/rounds. In a wireless network, UEs may transmit their local FL models (trained using their locally collected data) to a base station (gNB). The gNB, acting as a central controller, may generate a global FL model using the received local FL models, and broadcast it back to all the UEs.

In synchronous ML model collection, each local model may contribute towards the aggregated model in each round of local ML model collection. Thus, for each round of model collection and aggregation, MTH may update the aggregated model after collecting the local trained models from all the distributed hosts/UEs. However, synchronous ML model collection may exhibit certain challenges. For example, in some cases, UEs may have other data (e.g., for ongoing service transactions) that they may like to transmit without much disruption to their own quality of service (QoS). The convergence time for FL may include not only the computation time on the local learners and the aggregator, but also the communication time between them, which may depend on the wireless link quality as well as data transmission requirements of the UEs (with corresponding delays to model transmission). In such scenarios, communication links between UE/DTH and gNB/MTH may become congested, and obtaining models from the distributed hosts within a latency budget is not feasible.

On the other hand, in some cases, the number of contributing DTHs may be large, and their model training data may be correlated. This implies that there is redundancy in the data that is aggregated at the gNB/MTH, which negates the need to collect models from all DTHs for any single update round. In other words, it may be possible to use a subset of DTHs/UEs with correlated training data to the update of the aggregated model in a given round. Through this method (i.e., asynchronous model collection), the accuracy of the aggregated model is not significantly degraded, given a good selection of the DTH subset to contribute to the aggregated model update.

The FL performance and convergence time may be significantly affected by model collection scheduling. The risk with asynchronous model collection is that UEs not sending their local trained models may have unique data characteristics that may determine the accuracy of the final model. Thus, an ineffective selection of UEs for model update in each round may result in a longer time for convergence or in an inefficiently trained model. Thus, to reduce communication load in collecting updated local models from all DTHs/UEs while also ensuring effective update of the aggregated model, it may be desirable to design a model collection scheme that efficiently selects a subset of UEs with mature/converged models in each round, leading to communication-efficient model collection. The mature/converged models may provide an indication that further training of the respective model at the UE/DTH may not significantly improve its performance. In the FL context, mature/converted models may provide an indication of readiness to be uploaded for aggregation. According to certain example embodiments, the model maturity may imply that the local ML model's readiness to be uploaded for aggregation at the MTH. In certain example embodiments, a set of rules may define this maturity including, for example, how different current model parameters are from the ones previously uploaded or the time elapsed after previous model upload(s). Thus, certain example embodiments may provide a communication-efficient model collection using a combination of synchronous and asynchronous ML model collection where a subset of UEs send their locally trained models in each round. If the UEs are selected intelligently in each round, convergence time of asynchronous model collection may approach synchronous model collection at smaller communication overhead.

$3^{rd}$ Generation Partnership Project (3GPP) TR 22.874 describes certain performance requirements on ML model collection in FL, as well as requirements on the transfer of trained ML models to the inference hosts, while other works discuss optimization problems related to scheduling problems in FL over wireless networks. However, there is currently no practical considerations and signaling aspects in relation to 5G wireless networks implementation. In addition, some works address the fetching of learning models from distributed hosts, but fail to provide any details to account for UEs' own data communication requirement in FL model aggregation. Thus, certain example embodiments aim to solve at least the problem of model collection from distributed hosts in a FL learning paradigm when data from the DTHs (e.g., UEs or gNB-DU in RAN split architecture) is highly correlated and thereby, resulting parameters (weights, gradients) for the distributed FL models may be highly correlated. In addition, to reduce communication overhead, certain example embodiments may provide local models that can be collected asynchronously from the UEs without compromising convergence speed of the aggregated FL model.

In certain example embodiments, the DTH may be implemented in UEs. However, in other example embodiments, DTHs may be implemented in gNBs or gNB-distributed unit (gNB-DU) entities, with the MTH being located in gNB/radio access network (RAN) intelligent controller (RIC)/training hose or gNB-central unit (gNB-CU).

Figure 3:
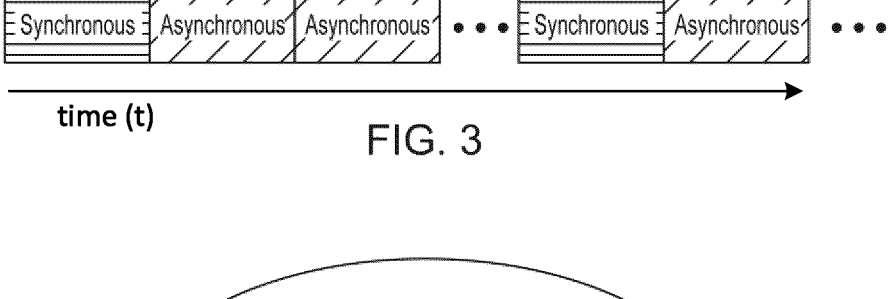
FIG. 3 illustrates an example of a synchronous machine learning (ML) model collection, according to certain example embodiments.

FIG. 3 illustrates an example of a combination of asynchronous and synchronous ML model collection, according to certain example embodiments. As illustrated in FIG. 3, the synchronous ML model collection may be repeated after a specified number of asynchronous ML model collection rounds N, to ensure that the data is still correlated for the DTHs in a particular cluster.

According to certain example embodiments, a communication-efficient model collection may be provided using a combination of synchronous and asynchronous ML model collection. In synchronous model collection mode, the individual models from all the DTHs may be evaluated to identify those with potentially correlated model parameters. For example, in the synchronous model collection mode, local parameters may be collected from all the distributed hosts to know if they are still correlated and should be part of the same cluster. According to certain example embodiments, the similarity of trained model parameters may imply high correlation in data, and in some cases, the correlation may be with different degrees. Further, a number of asynchronous ML model collection rounds may be executed to take advantage of the observed correlation by selecting a subset of UEs to send their locally trained models in each asynchronous ML model collection round.

Figure 4:
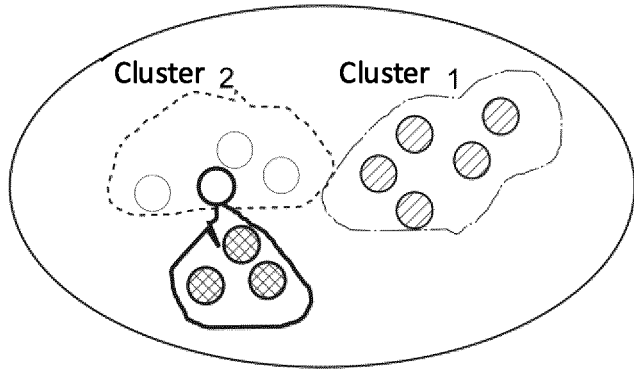
FIG. 4 illustrates an example of clustering at a meta training host, according to certain example embodiments.

FIG. 4 illustrates an example of clustering at the MTH, according to certain example embodiments. In particular, FIG. 4 illustrates clustering based on correlated training data (local model parameters), where the clustering may be formed based on correlation of local parameters transmitted by the DTHs to the MTH. In certain example embodiments, physical proximity may be used to evaluate candidates to be in the same cluster. However, in certain example embodiments, two closely located nodes may not be correlated in locally trained models.

As noted above, clustering may be performed in synchronous mode. In this round, the DTHs/UEs may send data including their local model parameters to the MTH to be used to cluster the UEs. According to certain example embodiments, the clustering may be based on correlation or similarity of model parameters, and not necessarily on physical geolocation. In certain example embodiments, with the assumption that high correlation in model parameters implies high correlation in local data to train that model, the MTH may identify UEs that have correlated data by evaluating the correlation of the model parameters. Thus, by using a ML classification technique, the MTH may form clusters of DTHs/UEs based on correlation of local training data.

In certain example embodiments, for UE selection in asynchronous mode, at least one UE may be selected for model training from each cluster in each round of asynchronous ML model collection. For example, a sub-group of one or more UEs in a particular training round may be selected from each cluster with an aim to achieve communication-link-efficient ML model collection. After each round, convergence of aggregated model may be evaluated. In certain example embodiments, the selection of at least one UE for model training, selection of a sub-group of UEs, and convergence of aggregated model may be repeated for a fixed number of asynchronous rounds, limited by a fixed maximum number N. According to certain example embodiments, after N rounds of asynchronous model collection, synchronous mode clustering may be re-executed followed by asynchronous model UE selection until FL aggregated model converges.

As described above, cluster formation in synchronous mode may be repeated after performing asynchronous mode model collection for a fixed number of rounds N. This procedure may be performed because similarity of trained model parameters between DTHs may change after some time (possibly due to UE mobility or change in UE application requirements). As asynchronous model may be based on correlation data (similarity of local models), failure to account for such changes in the distributions of the local data may have an effect on the convergence of aggregated FL model. Consequently, the clustering algorithm may be re-executed in synchronous mode.

Figure 5:
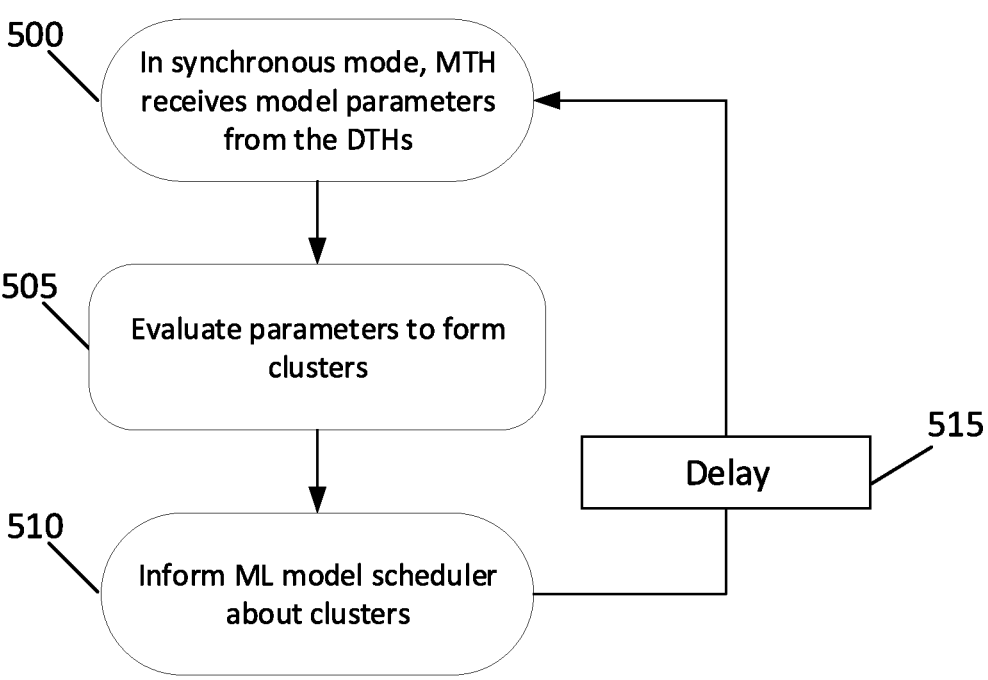
FIG. 5 illustrates an example flow diagram for periodic synchronous model clustering, according to certain example embodiments.

According to certain example embodiments, in FL, the DTHs may send their local trained models to the MTH in synchronous mode. To reduce communication between the DTHs and the MTH, certain example embodiments provide a method that makes use of clustering techniques as well as asynchronous communication to reduce communication between the DTHs and the MTH FIG. 5 illustrates an example flow diagram for periodic synchronous model clustering, according to certain example embodiments. In certain example embodiments, the DTH in a coverage area may be clustered such that the DTHs in one cluster have a high correlation of training data. According to certain example embodiments, geographical proximity may be helpful, but is not the only option. Instead, the clustering algorithm may form clusters based on the correlation of data/similarity of local ML model parameters. In certain example embodiments, synchronous mode clustering is not a one time operation. Instead, it may be repeated after some time to determine if data of the clusters in the same cluster is still correlated, and change clusters when needed.

As illustrated in FIG. 5, a clustering algorithm may perform clustering in synchronous model transfer mode. In particular, at 500, in synchronous mode, the gNB may receive model parameters from the UEs (e.g., DTH). At 505, the gNB (e.g., MTH) may evaluate the parameters, and form clusters of the UEs based on the evaluation of the parameters. At 510, the gNB may inform the ML model scheduler about the formed clusters. In certain example embodiments, the ML model scheduler may correspond to an algorithm that may be executed by a computer or computing device to execute the synchronous ML model collection illustrated in FIG. 3, and the asynchronous model collection illustrated in FIG. 6. At 515, there may be a delay before the gNB receives additional model parameters from the UEs.

Different clustering algorithms may be used for clustering. However, since the number of clusters are not known a priori, the clustering algorithms that do not require the number of clusters as input may be applicable here. For example, when local training data is not very well correlated, but the number of clusters is fixed (even to a small value), UEs in the same cluster may have data that is not very well correlated and, thus, any selected subset of UEs may not well-represent the data of the other UEs. These clustering requirements may be met by certain examples of clustering algorithms that do not need to fix the number of clusters in the beginning. As the basis for clustering, these algorithms may take a correlation parameter defined in terms of distance between data points.

In certain cases, an asynchronous mode model collection may be provided. There may be an aggregated model at the MTH, and the local models of the DTH may have been updated with the aggregated model. Subsequent to the update with the aggregated model, the DTH in a cluster may have updated matured local trained models. There may be multiple maturity conditions that may be utilized to decide when to collect the local models, and use of the local models that have fulfilled the maturity condition may not necessarily imply that the global model will converge. Thus, a method may be needed to ensure that the global model can be updated to converge regardless of the type of maturity condition used to collect the local models.

As described herein, according to certain example embodiments, UEs may be represented by the DTHs. The reference signal received power (RSRP) measurements received from the DTHs may be employed as a metric to cluster the DTHs. Other link performance metric(s) may also be used depending on the DTH-MTH deployment scenario. For example, for the case when DTH is deployed in gNB-DUs, the latency performance, or available signaling capacity, on the communication interface between the gNB-DU and gNB-CU may be used.

According to certain example embodiments, candidate DTHs may be selected. As described herein, V may represent a set of UEs in the same cluster, which is determined in the synchronous mode and may vary from cluster to cluster. U may correspond to the number of UEs scheduled for model transmission in a single round. It may be a preconfigured fixed number for each cluster, and may vary with clusters. In each round of asynchronous model collection, $U \leq |V|$ DTH/UEs can transfer their local models to the MTH.

In certain example embodiments, UEs may be selected to send their models in a round. For example, U DTH/UEs may be partitioned into two parts to separate the DTH/UEs with the largest RSRP values from the rest. For example, X may represent a subset of UEs with the larges RSRP values, where the size of set X, $|X| < U$ is preconfigured number, and $\tilde{U}$=set of size $(U-|X|)$ randomly selected UEs from the remaining $(|V|-|X|)$ UEs.

Figure 6:
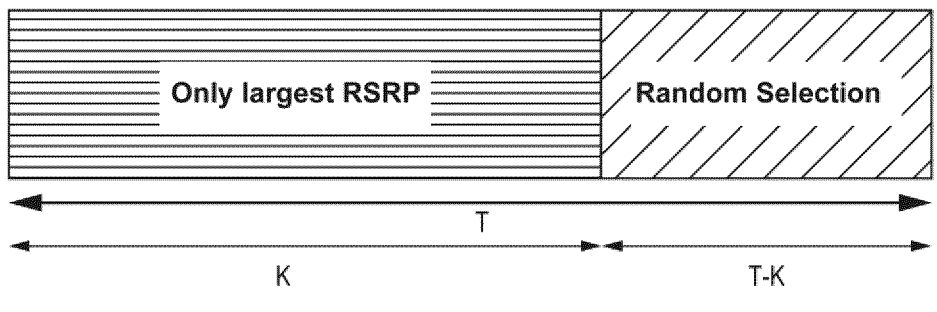
FIG. 6 illustrates a single round of asynchronous model collection, according to certain example embodiments.

FIG. 6 illustrates a single round of asynchronous model collection, according to certain example embodiments. As illustrated in FIG. 6, a model collection may be executed for each cluster. In particular, FIG. 6 illustrates a single round of asynchronous model collection that includes T time slots, which are divided into K and T–K sets of slots. In certain example embodiments, the duration of the time slot may be, for example, 10 ms or 100 ms, and the time slot may not necessarily be the same as the radio slot duration. In other example embodiments, the duration of the time slot may be more or less than 10 ms and 100 ms. In further example embodiments, the time duration may depend on a particular FL use case, as well as a number of learners.

As illustrated in FIG. 6, in the first K time slots, a set of $|X| < U$ DTH from each cluster with the largest received serving beam RSRP values may be selected for model transmission to the MTH. After K time slots, a set of $U-|X|$ randomly selected DTH which have not yet transmitted their models in this round, may be given an opportunity to transmit their updated models in the remaining slots of the asynchronous model collection round. According to certain example embodiments, this random sampling may be introduced to provide model transmission opportunity to the DTH with poor channel conditions (e.g., lower RSRP) because they may have locally trained models trained over data that are not very much correlated with other DTHs in the cluster. In certain example embodiments, this type of de-correlation may also happen for the DTH with the largest RSRP. In addition, this type of random sampling may be used in stochastic optimization to avoid local minima in optimization. After T slots, a new round of model collection may start until model convergence. This round may be synchronous or asynchronous depending if N rounds of asynchronous model collection have been completed or not.

Figure 7:
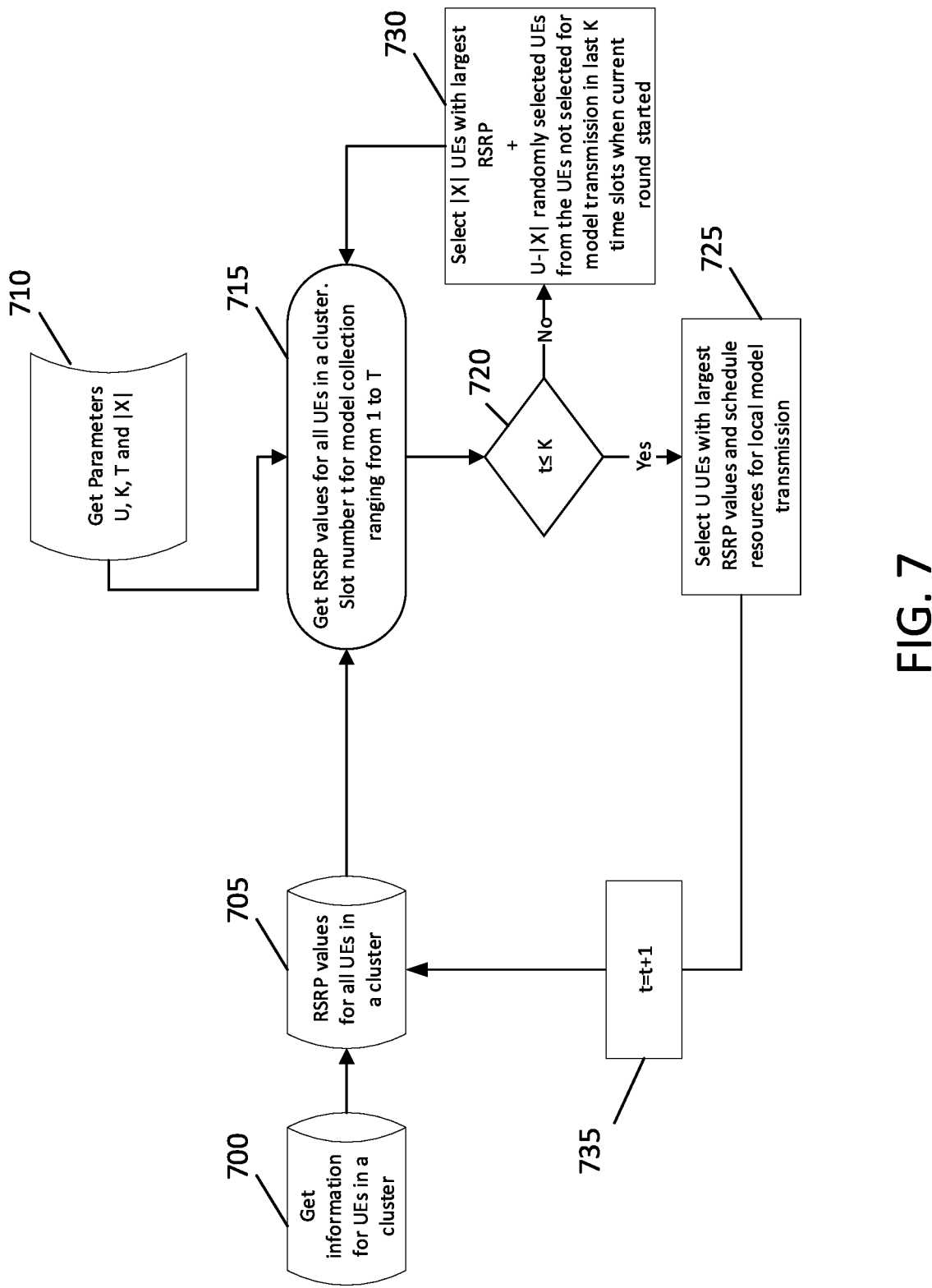
FIG. 7 illustrates an example flow diagram for asynchronous model collection, according to certain example embodiments.

FIG. 7 illustrates an example flow diagram for asynchronous model collection, according to certain example embodiments. In particular, FIG. 7 corresponds to one DTH cluster, and illustrates an asynchronous model collection when the MTH uses DTHs RSRP measurements as selection criteria between DTHs. At 700, the MTH may obtain information for UEs in a specific cluster. At 705, the MTH may obtain RSRP values for all the UEs in the cluster. At 710, the MTH may obtain values for parameters U, K, T, and $|X|$. At 715, the MTH may obtain RSRP values for all the UEs in the cluster, and full round of asynchronous model collection with slot number t ranging from 1 to T may be performed. At 720, if t K, then, at 725, the MTH may select U UEs with the largest RSRP values, and schedule resources for local model transmission. After the selection of U UEs, at 735, the slot number t may be incremented ranging from 1 to T. However, if, at 720, t is not less than or equal to K, at 730, the MTH may select $|X|$ UEs with the largest RSRP, and $U-|X|$ randomly selected UEs from the UEs not selected for model transmission in the last K time slots when the current round has started.

According to certain example embodiments, implementation of DTH selection in a cluster may be performed. For example, a flag model_ready may be configured at the DTHs/UEs which may be reset for the UEs when asynchronous mode starts. For example, when the UEs with the largest RSRP values are selected for transmission in the first phase (K time slots), they may set model_ready=1 after sending their updated models to the MTH. At the start of the next phase (T–K time slots) when random UEs are selected for model collection, only those UEs may be considered which report model_ready=0. Subsequently, after each selection of UEs in the random selection phase, the UEs with model_ready=0 report, the UEs which have been selected and have transmitted their model, may set the model_ready=1 just as the UEs in the first phase, and random selection may be made until the asynchronous round terminates.

According to certain example embodiments, during cluster formation, the MTH may evaluate DTH local model parameters from DTHs in synchronous mode model collection, and based on parameter correlation/similarity, may decide to form DTH clusters using a clustering algorithm. In certain example embodiments, no new signaling between MTH and DTHs may be required for clustering, and DTHs may be oblivious of the clustering.

In certain example embodiments, with DTH selection in a cluster, the UEs may inform the serving MTH of their model maturity conditions (e.g. via RRC signaling). Then, at the start of every synchronous round of model collection, the UEs may reset their model_ready flag=0. Based on available link resources (RBs), the gNB may decide that it can receive U models from the UEs in each cluster. For the first $|X| \leq U$ UEs selection, it can make a decision based on available RSRP reports from the DTH/UEs. Further, the DTHs may set the model_ready flag depending on their own state of training.

According to certain example embodiments, the MTH may request all the UEs to send their model_ready flags (e.g., via RRC signaling), and random selection may be based among the UEs that reported model_ready=0. The outcome of the selection may be signaled to the corresponding UEs (via RRC signaling). In addition, the randomly selected UEs may set their flags after selection, and the UEs may send model_flag ready again to the gNB (via RRC signaling) until $U-|X|$ random selections are made, or all the UEs in a clustered report model_ready flag as set. At this point, the synchronous model collection round terminates. After termination of the synchronous model collection, the asynchronous model collection round may be followed by another asynchronous round of model collection or synchronous round if N asynchronous rounds have been completed.

Figure 8:
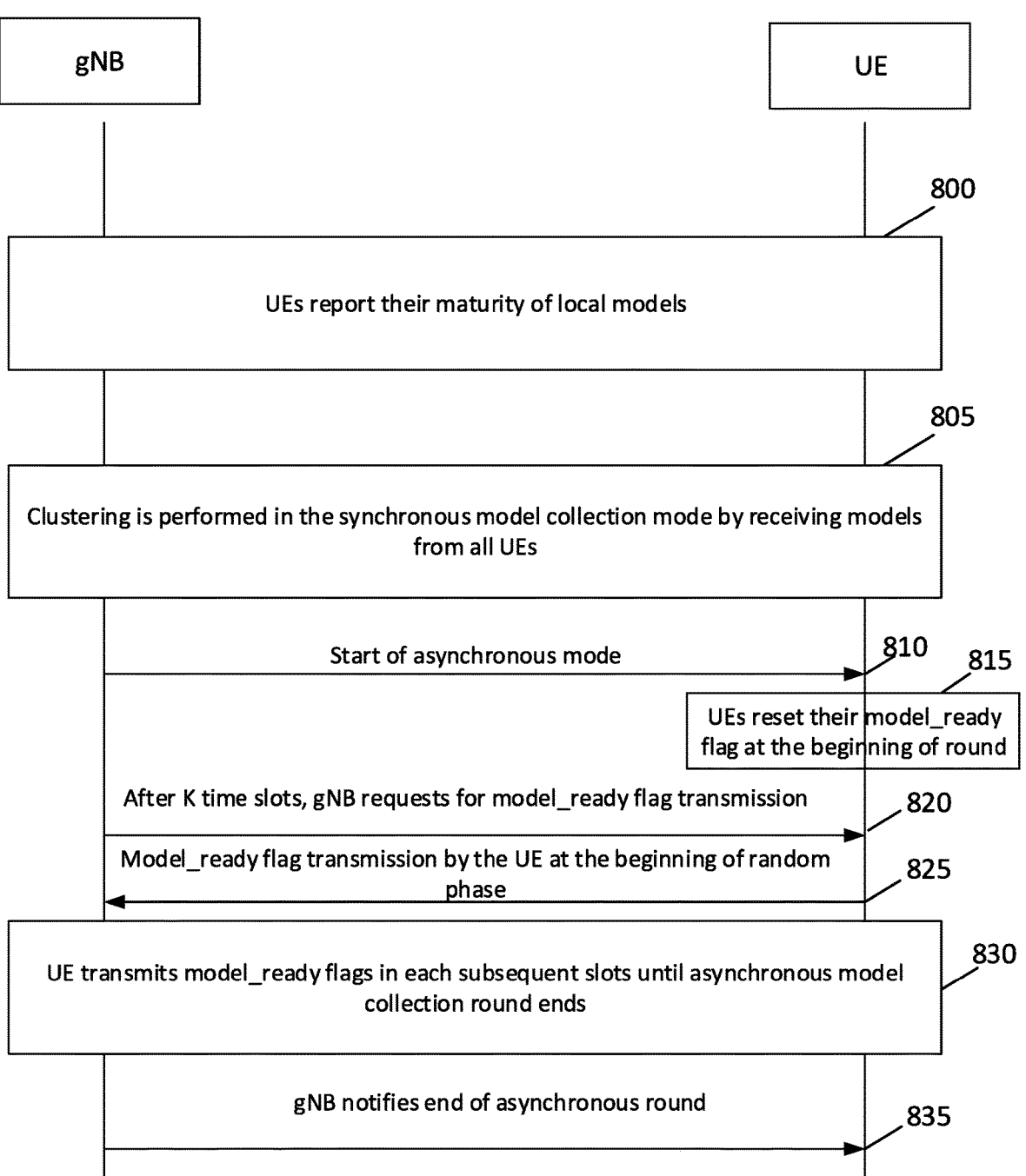
FIG. 8 illustrates an example signal diagram for user equipment selection in a cluster, according to certain example embodiments.

FIG. 8 illustrates an example signal diagram for the UE selection in a cluster, according to certain example embodiments. At 800, the UEs may report their maturity of local models to the gNB. At 805, clustering may be performed by the gNB in the synchronous model collection mode by receiving models from all the UEs. At 810, asynchronous mode model collection may begin. At 815, the UEs may reset their model_ready flag at the beginning of the round. At 820, after K time sots, the gNB may request for model_ready flag transmission. At 825, model_ready flag transmission may be performed by the UE at the beginning of the random selection phase for the UEs with model_ready status reset. At 830, the UE may transmit model_ready flags in each subsequent slots until the asynchronous model collection round ends. At 835, the gNB may notify the UE that the asynchronous round has ended.

In certain example embodiments, with DTH/gNB-DU selection in a cluster, the DTH may inform the MTH/gNB-CU of the DTH's model maturity conditions (e.g. via F1-C signaling). Then, at the start of every synchronous round of model collection, the DTHs may reset their model_ready flag. Based on available F1 link quality (e.g. delay budget or available signaling capacity), the MTH may decide that it can receive U models from the DTHs in each cluster. For the first $|X| < U$ DTHs selection, it can make the decision based on available F1 link quality for each gNB-DU-gNB-CU pair. Further, in certain example embodiments, the DTHs may set the model_ready flag depending on their own state of training.

After the model_ready flags have been set, the MTH may request the DTHs to send their model_ready flags (e.g. via F1-C signaling), and a random selection may be based among the DTHs with model_ready=0. In addition, the outcome of the selection may be signaled to the corresponding DTHs (e.g. via F1-C signaling). Further, the randomly selected DTHs may set their flags after selection, and the DTHs may send model_ready flag again to the MTH (e.g. via F1-C signaling) until $U-|X|$ random selections are made or all UEs in a clustered report model_ready flag has been set. At this point, synchronous model collection round terminates, and the asynchronous model collection is triggered by the MTH.

FIG. 9 illustrates a flow diagram of a method, according to certain example embodiments. In certain example embodiments, the flow diagram of FIG. 9 may be performed by a network entity or network node in a 3GPP system, such as LTE or 5G-NR. For instance, in an example embodiment, the method of FIG. 9 may be performed by a UE and/or DTH, for instance similar to apparatuses 10 or 20 illustrated in FIGS. 11(*a*) and 11(*b*).

According to certain example embodiments, the method of FIG. 9 may include, at 900, transmitting local model parameters following training of a model of at least one network element to a network node to be used to cluster the at least one network element with one or more other network elements. The method may also include, at 905, training, by one or more network elements selected from the cluster, an aggregated model using the local model parameters. The method may further include, at 910, transmitting, by the one or more network elements selected from the cluster, updated local model parameters of the at least one network element as a result of the training to the network node.

In certain example embodiments, the local model parameters may be transmitted in a synchronous mode, the aggregated model may be trained in an asynchronous mode, and the updated local model parameters may be transmitted in the synchronous mode or the asynchronous mode. In some example embodiments, the updated local model parameters are transmitted to the network node by the one or more network elements selected from the cluster based on a reference signal received power value or a link performance metric among the cluster of one or more other network elements, or by the one or more network elements selected from the cluster when it has been randomly selected to transmit the updated local model parameters. In other example embodiments, when the one or more network elements selected from the cluster has been randomly selected, the updated local model parameters may be transmitted until the asynchronous mode is terminated.

According to certain example embodiments, the method may further include configuring a flag at the one or more network elements selected from the cluster. According to other example embodiments, the method may also include resetting the flag at the start of every asynchronous mode. According to further example embodiments, the method may include setting the flag in the one or more network elements selected from the cluster after transmitting the updated local model parameters. In certain example embodiments, transmission of the updated local model parameters may be performed via radio resource control signaling or control plane interface signaling. In some example embodiments, the network element may be a user equipment.

FIG. 10 illustrates a flow diagram of another method, according to certain example embodiments. In an example embodiment, the method of FIG. 10 may be performed by a network entity, network node, or a group of multiple network elements in a 3GPP system, such as LTE or For instance, in an example embodiment, the method of FIG. 10 may be performed by a gNB and/or MTH, for instance similar to apparatus 20 illustrated in FIGS. 11(*a*) and 11(*b*).

According to certain example embodiments, the method of FIG. 10 may include, at 1000, receiving local model parameters from one or more network elements. The method may also include, at 1005, identifying one or more network elements among the one or more network elements that have correlated data by evaluating a correlation of the local model parameters. The method may further include, at 1010, clustering the one or more network elements based on the evaluation. In addition, the method may include, at 1015, selecting at least one network element from the cluster for model training. Further, the method may include, at 1020, receiving, from the selected network element, updated local model parameters. In addition, the method may include, at 1025, evaluating convergence of aggregated models based on the updated local model parameters.

According to certain example embodiments, the selection of the at least one network element may be repeated for a fixed number of rounds, and the clustering of the one or more network elements may be re-executed after the fixed number of rounds followed by the selection of the at least one network element. According to some example embodiments, clustering the one or more network elements may be performed under a synchronous mode, and selecting the at least one network element may be performed under an asynchronous mode. According to other example embodiments, the asynchronous mode comprises a time slot T divided into two parts, a first part with K slots, and a second part with T-K slots.

In certain example embodiments, the method may further include receiving a reference signal received power value or a link performance metric for the one or more network elements. In some example embodiments, during the K time slots, the at least network element in the cluster may be selected for transmission of the updated local model parameters based on the reference signal received power value or the link performance metric. In other example embodiments, after the K time slots, the at least one network element may be selected randomly for transmission of the updated local model parameters, or no network element may be selected.

Figure 11A:
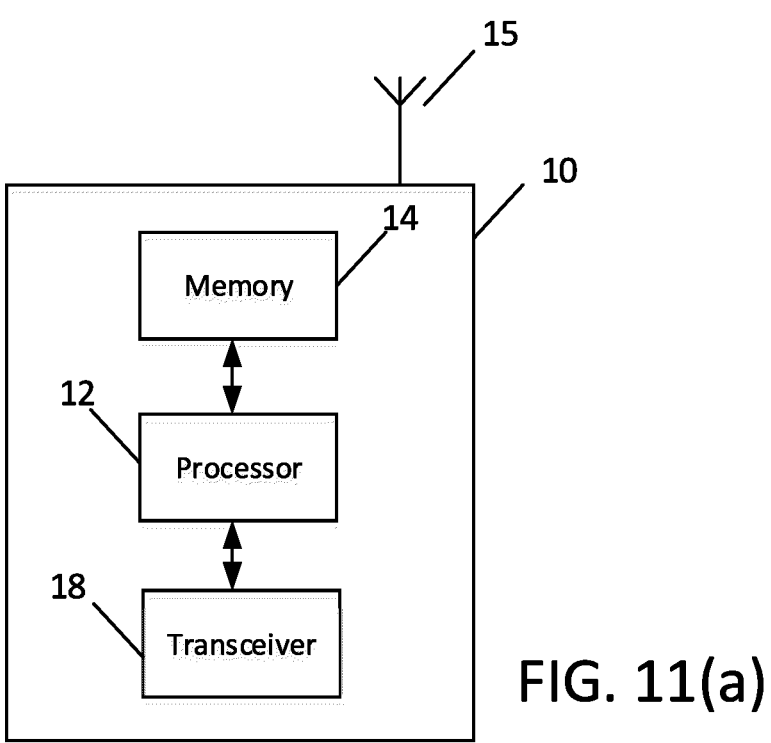
FIG. 11(a) illustrates an apparatus, according to certain example embodiments.
Figure 11B:
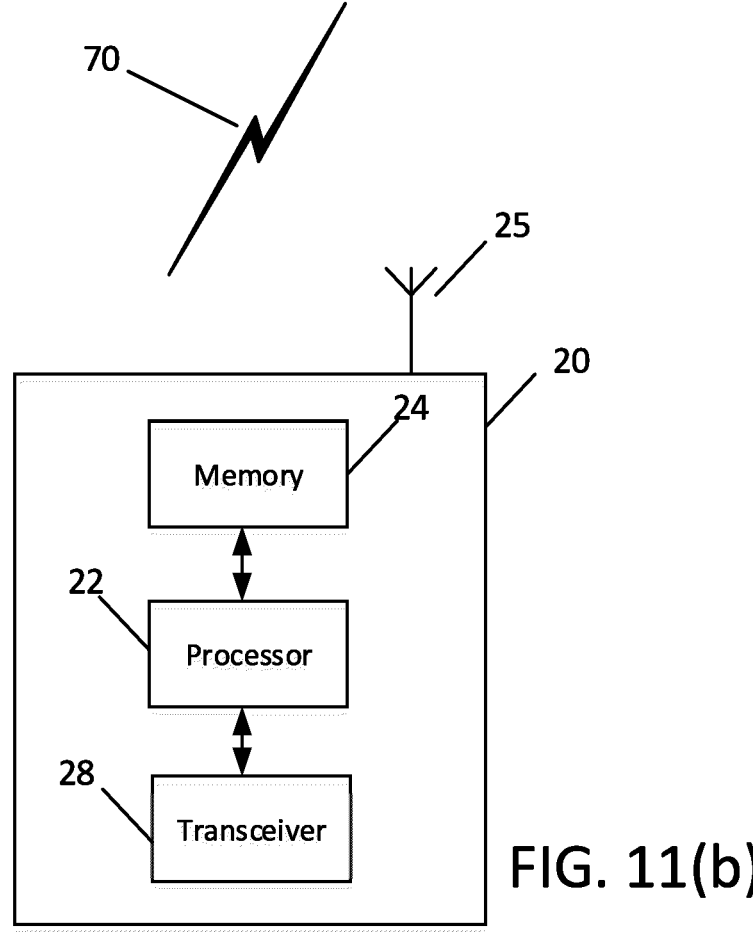
FIG. 11(b) illustrates another apparatus, according to certain example embodiments.

FIG. 11(*a*) illustrates an apparatus 10 according to certain example embodiments. In certain example embodiments, apparatus 10 may be a node or element in a communications network or associated with such a network, such as a UE, mobile equipment (ME), mobile station, mobile device, stationary device, DTH, DTH deployed in gNB-DUs, or other device. It should be noted that one of ordinary skill in the art would understand that apparatus 10 may include components or features not shown in FIG. 11(*a*).

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 11(*a*).

As illustrated in the example of FIG. 11(*a*), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 11(*a*), multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-9.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-9.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR, or alternatively the communication may be via non-radio technology or non-radio connectivity.

According to certain example embodiments, processor 12 and memory 14 may be included in or may form a part of processing circuitry or control circuitry. In addition, in some example embodiments, transceiver 18 may be included in or may form a part of transceiving circuitry.

As discussed above, according to certain example embodiments, apparatus 10 may be a UE and/or DTH, or DTH deployed in gNB-DUs, for example. According to certain example embodiments, apparatus 10 may be controlled by memory 14 and processor 12 to perform the functions associated with example embodiments described herein. For instance, in certain example embodiments, apparatus 10 may be controlled by memory 14 and processor 12 to transmit local model parameters following training of a model of at least one network element to a network node to be used to cluster the at least one network element with one or more other network elements. Apparatus 10 may also be controlled by memory 14 and processor 12 to train, by one or more network elements selected from the cluster, an aggregated model using the local model parameters. Apparatus 10 may further be controlled by memory 14 and processor 12 to transmit, by the one or more network elements selected from the cluster, updated local model parameters of the at least one network element as a result of the training to the network node.

FIG. 11(*b*) illustrates an apparatus 20 according to certain example embodiments. In certain example embodiments, the apparatus 20 may be a node or element in a communications network or associated with such a network, such as a base station, a Node B, an evolved Node B (eNB), 5G Node B or access point, next generation Node B (NG-NB or gNB), MTH, gNB-DU, gNB-CU, and/or WLAN access point, associated with a radio access network (RAN), such as an LTE network, 5G or NR. It should be noted that one of ordinary skill in the art would understand that apparatus 20 may include components or features not shown in FIG. 11(*b*).

As illustrated in the example of FIG. 11(*b*), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 11(*b*), multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-8 and 10.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-8 and In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 20 may be a network element, node, host, or server in a communication network or serving such a network. For example, apparatus 20 may be a satellite, base station, a Node B, an evolved Node B (eNB), 5G Node B or access point, next generation Node B (NG-NB or gNB), MTH, and/or WLAN access point, associated with a radio access network (RAN), such as an LTE network, 5G or NR. According to certain embodiments, apparatus 20 may be controlled by memory 24 and processor 22 to perform the functions associated with any of the embodiments described herein.

For instance, in certain example embodiments, apparatus 20 may be controlled by memory 24 and processor 22 to receive local model parameters from one or more network elements. Apparatus 20 may also be controlled by memory 24 and processor 22 to identify one or more network elements among the one or more network elements that have correlated data by evaluating a correlation of the local model parameters. Apparatus 20 may further be controlled by memory 24 and processor 22 to cluster the one or more network elements based on the evaluation. In addition, apparatus 20 may be controlled by memory 24 and processor 22 to select at least one network element from the cluster for model training. Further, apparatus 20 may be controlled by memory 24 and processor 22 to receive, from the selected network element, updated local model parameters. Apparatus 20 may also be controlled by memory 24 and processor 22 to evaluate convergence of aggregated models based on the updated local model parameters.

Further example embodiments may provide means for performing any of the functions, steps, or procedures described herein. For instance one example embodiment may be directed to an apparatus that includes means for transmitting local model parameters following training of a model of at least one network element to a network node to be used to cluster the at least one network element with one or more other network elements. The apparatus may also include means for training, by one or more network elements selected from the cluster, an aggregated model using the local model parameters. The apparatus may further include means for transmitting, by the one or more network elements selected from the cluster, updated local model parameters of the at least one network element as a result of the training to the network node.

Other example embodiments may be directed to an apparatus that includes means for receiving local model parameters from one or more network elements. The apparatus may also include means for identifying one or more network elements among the one or more network elements that have correlated data by evaluating a correlation of the local model parameters. The apparatus may further include means for clustering the one or more network elements based on the evaluation. In addition, the apparatus may include means for selecting at least one network element from the cluster for model training. Further, the apparatus may include means for receiving, from the selected network element, updated local model parameters. The apparatus may also include means for evaluating convergence of aggregated models based on the updated local model parameters.

Certain example embodiments described herein provide several technical improvements, enhancements, and/or advantages. In some example embodiments, it may be possible to eliminate any need for all DTHs to send their local models in each round, which saves on communication overhead between the DTHs and the MTH. In other example embodiments, communication reduction may be proportional to the order of number of clusters. In further example embodiments, the DTHs with good channels may be selected most of the time, resulting in further power saving/spectral efficiency. In addition, to support accuracy of the aggregated model, the DTHs may be provided with a chance to transmit their local models in each round, thereby convergence of aggregated global ML model may be envisioned at minimum loss. According to other example embodiments, the DTHs may be selected intelligently in each round, which may result in convergence time of asynchronous model collection to approach synchronous model collection at smaller communication overhead.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

| Partial Glossary | |
|---|---|
| 3GPP | 3rd Generation Partnership Project |
| 5G | $5^{th}$ Generation |
| 5GCN | 5G Core Network |
| DTH | Distributed Training Host |
| eNB | Enhanced Node B |
| F1 | 3GPP Interface Between gNB-CU and gNB-DU |
| FL | Federated Learning |
| gNB | 5G or Next Generation NodeB |
| ML | Machine Learning |
| MTH | Meta Training Host |
| NG-RAN | Next Generation RAN |
| NR | New Radio |
| RAN | Radio Access Network |
| RIC | RAN Intelligent Controller |
| UE | User Equipment |

The invention claimed is:

1. An apparatus, comprising:

at least one processor; and at least one memory comprising computer program code, the at least one memory and the computer program code are configured, with the at least one processor, to cause the apparatus at least to:

receive local model parameters in a synchronous model collection mode from a first plurality of network elements;

identify a second plurality of network elements among the first plurality of the network elements that have correlated data by evaluating a correlation of the local model parameters, wherein at least one of the local model parameters is defined in terms of distance between data points;

based on the evaluation, cluster the first plurality of network elements, wherein the clustering is performed with a number of the clusters being unknown;

select network elements from the cluster for model training in an asynchronous model collection mode, wherein the selection comprises:

selecting, during a first part of a time slot T in an asynchronous model collection round, a first network element with the following:

a largest reference signal received power (RSRP) value among the cluster; and a model_ready flag=0 indicating that the first network element has not yet transmitted updated local model parameters;

during a second part of the time slot T that is later than the first part in the asynchronous model collection round, randomly selecting a second network element with the a model_ready flag=0 regardless of a corresponding RSRP value;

receive, from each of the first and the second network elements, updated local model parameters, wherein after each of the first and the second network elements have transmitted their respective updated local model parameters, each of the first and second network elements set their respective model_ready flag=0 to model_ready flag=1 indicating that a transmission of updated local model parameters has occurred;

train an aggregated model using the updated local model parameters received from the first and second network elements;

based on the updated local model parameters received from the first network element and the second network element, determine whether the aggregated model has reached a convergence condition, the convergence condition comprising: (i) a threshold level of similarity between consecutive aggregated model updates, (ii) a threshold reduction in change of the aggregated model parameters relative to a prior update, and (iii) expiration of a fixed maximum number of asynchronous rounds N; and upon determining the convergence condition is satisfied, transmit the aggregated model to the first plurality of network elements for inference.

2. The apparatus according to claim 1, wherein the selection of the network elements is repeated for a fixed number of rounds.

3. The apparatus according to claim 2, wherein clustering the one or more network elements is performed under a synchronous mode.

4. The apparatus according to claim 3, wherein the asynchronous mode comprises the time slot T divided into two the first part and the second part, the first part with K slots, and the second part with T–K slots.

5. The apparatus according to claim 4, wherein the clustering of the first plurality of network elements is not based on physical geolocation of the first plurality of network elements.

6. The apparatus according to claim 5, wherein |X| network elements are selected during the first part of the time slot T based on largest RSRP values, and U–|X| network elements are randomly selected during the second part of the time slot T, where U is a preconfigured maximum number of network elements scheduled to transmit in a round.

7. The apparatus according to claim 6, wherein the convergence condition is determined by comparing similarity of aggregated model updates using a correlation parameter defined as a distance between parameter vectors of the updated local model parameters.

8. A system comprising:

an apparatus:

at least one processor; and at least one memory comprising computer program code, the at least one memory and the computer program code are configured, with the at least one processor, to cause the apparatus at least to:

receive local model parameters in a synchronous model collection mode from a first plurality of network elements;

identify a second plurality of network elements among the first plurality of the network elements that have correlated data by evaluating a correlation of the local model parameters, wherein at least one of the local model parameters is defined in terms of distance between data points;

based on the evaluation, cluster the first plurality of network elements, wherein the clustering is performed with a number of the clusters being unknown;

select network elements from the cluster for model training in an asynchronous model collection mode, wherein the selection comprises:

selecting, during a first part of a time slot T in an asynchronous model collection round, a first network element with the following:

a largest reference signal received power (RSRP) value among the cluster; and a model_ready flag=0 indicating that the first network element has not yet transmitted updated local model parameters;

during a second part of the time slot T that is later than the first part in the asynchronous model collection round, randomly selecting a second network element with the a model_ready flag=0 regardless of a corresponding RSRP value;

receive, from each of the first and the second network elements, updated local model parameters, wherein after each of the first and the second network elements have transmitted their respective updated local model parameters, each of the first and second network elements set their respective model_ready flag=0 to model_ready flag=1 indicating that a transmission of updated local model parameters has occurred;

train an aggregated model using the updated local model parameters received from the first and second network elements;

based on the updated local model parameters received from the first network element and the second network element, determine whether the aggregated model has reached a convergence condition, the convergence condition comprising: (i) a threshold level of similarity between consecutive aggregated model updates, (ii) a threshold reduction in change of the aggregated model parameters relative to a prior update, and (iii) expiration of a fixed maximum number of asynchronous rounds N; and upon determining the convergence condition is satisfied, transmit the aggregated model to the first plurality of network elements for inference.

9. The system according to claim 8, wherein the selection of the network elements is repeated for a fixed number of rounds.

10. The system according to claim 9, wherein clustering the one or more network elements is performed under a synchronous mode.

11. The system according to claim 10, wherein the asynchronous mode comprises the time slot T divided into two the first part and the second part, the first part with K slots, and the second part with T–K slots.

12. The system according to claim 11, wherein the clustering of the first plurality of network elements is not based on physical geolocation of the first plurality of network elements.

13. The system according to claim 12, wherein $|X|$ network elements are selected during the first part of the time slot T based on largest RSRP values, and $U-|X|$ network elements are randomly selected during the second part of the time slot T, where U is a preconfigured maximum number of network elements scheduled to transmit in a round.

14. The system according to claim 13, wherein the convergence condition is determined by comparing similarity of aggregated model updates using a correlation parameter defined as a distance between parameter vectors of the updated local model parameters.

15. A method comprising:

receiving local model parameters in a synchronous model collection mode from a first plurality of network elements;

identifying a second plurality of network elements among the first plurality of the network elements that have correlated data by evaluating a correlation of the local model parameters, wherein at least one of the local model parameters is defined in terms of distance between data points;

based on the evaluation, clustering the first plurality of network elements, wherein the clustering is performed with a number of the clusters being unknown;

selecting network elements from the cluster for model training in an asynchronous model collection mode, wherein the selection comprises:

selecting, during a first part of a time slot T in an asynchronous model collection round, a first network element with the following:

a largest reference signal received power (RSRP) value among the cluster; and a model_ready flag=0 indicating that the first network element has not yet transmitted updated local model parameters;

during a second part of the time slot T that is later than the first part in the asynchronous model collection round, randomly selecting a second network element with the a model_ready flag=0 regardless of a corresponding RSRP value;

receiving, from each of the first and the second network elements, updated local model parameters, wherein after each of the first and the second network elements have transmitted their respective updated local model parameters, each of the first and second network elements set their respective model_ready flag=0 to model_ready flag=1 indicating that a transmission of updated local model parameters has occurred;

training an aggregated model using the updated local model parameters received from the first and second network elements; and based on the updated local model parameters received from the first network element and the second network element, determining whether the aggregated model has reached a convergence condition, the convergence condition comprising: (i) a threshold level of similarity between consecutive aggregated model updates, (ii) a threshold reduction in change of the aggregated model parameters relative to a prior update, and (iii) expiration of a fixed maximum number of asynchronous rounds N; and upon determining the convergence condition is satisfied, transmitting the aggregated model to the first plurality of network elements for inference.

16. The method according to claim 15, wherein the selection of the network elements is repeated for a fixed number of rounds.

17. The method according to claim 16, wherein clustering the one or more network elements is performed under a synchronous mode.

18. The method according to claim 17, wherein the asynchronous mode comprises the time slot T divided into two the first part and the second part, the first part with K slots, and the second part with T–K slots.

19. The method according to claim 18, wherein the clustering of the first plurality of network elements is not based on physical geolocation of the first plurality of network elements.

20. The method according to claim 19, wherein $|X|$ network elements are selected during the first part of the time slot T based on largest RSRP values, and $U-|X|$ network elements are randomly selected during the second part of the time slot T, where U is a preconfigured maximum number of network elements scheduled to transmit in a round.

\* \* \* \* \*